United States Patent [19]
Hiramatsu et al.

[11] Patent Number: 6,058,235
[45] Date of Patent: May 2, 2000

[54] LINE TERMINATING DEVICE

[75] Inventors: Shinji Hiramatsu; Natsuo Masuda; Masahiro Haga; Toshihiko Motoseko; Hiroyuki Abe; Masatomo Ohta, all of Kawasaki, Japan

[73] Assignee: Fujitsu Limited, Kawasaki, Japan

[21] Appl. No.: 09/190,020

[22] Filed: Nov. 12, 1998

[30] Foreign Application Priority Data

Jun. 23, 1998 [JP] Japan .................................. 10-176315

[51] Int. Cl.$^7$ ...................................................... G02B 6/00
[52] U.S. Cl. ............................ 385/135; 385/92; 359/163
[58] Field of Search ..................................... 385/135, 134, 385/139, 88, 89, 92; 359/162, 163; 257/678

[56] References Cited

U.S. PATENT DOCUMENTS 5,479,288  12/1995  Ishizuka et al. ........................... 385/92
5,703,991  12/1997  Izumi ..................................... 385/135
5,828,807  10/1998  Tucker et al. ............................ 385/135

*Primary Examiner*—Hemang Sanghavi
*Attorney, Agent, or Firm*—Staas & Halsey, LLP

[57] ABSTRACT

A line terminating device including a housing having first and second openings and a main printed wiring board vertically mounted in a front end portion of the housing. A first optical module for performing conversion between an optical signal and an electrical signal, a WDM module, and electronic components are mounted on the main printed wiring board. The line terminating device further includes an extension electronic circuit package inserted from the first opening into the housing and a power supply package inserted from the second opening into the housing. A second optical module for performing conversion between an optical signal and an electrical signal is mounted on the extension electronic circuit package. An extra optical cable length winding drum is mounted on an upper surface of the housing. An extra length of a subscriber optical cable is wound around the drum, and an extra length of a terminal optical cable connected to a terminal device is also wound around the drum.

6 Claims, 11 Drawing Sheets

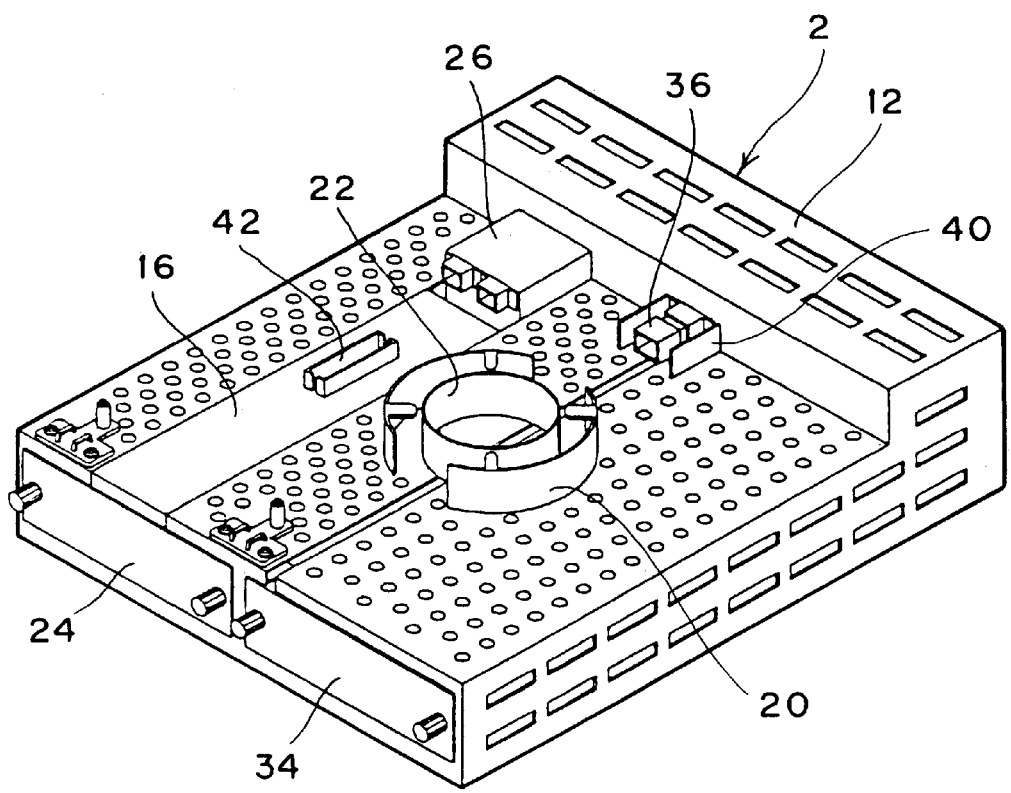
F I G. 2

LINE TERMINATING DEVICE

BACKGROUND OF THE INVENTION

1. Field of the Invention

The present invention relates to a line terminating device such as an optical network unit (ONU).

2. Description of the Related Art

In recent years, a transmission line for a communication device has been on the way of replacement from an electrical cable (coaxial cable or twisted cable) into an optical cable. Particularly, it has been considered that a line terminating device related to fiber-to-the-home (FTTH) is to be introduced to every home, so that size reduction of the device has been demanded. From the viewpoint of size reduction of the device, a mounting structure exhibiting the maximum functions of mounted components occupies a considerable proportion of importance and it is therefore necessary to design a mounting structure suitable for the size reduction. Further, it is also necessary to design a structure for efficiently accommodating extra lengths of optical cables connected to the line terminating device.

Although the FTTH-related line terminating device is required to have a compact size in consideration of its introduction into every home, it can be said that a line terminating device in the related art does not enough meet the requirement for the size reduction. Further, while a subscriber optical cable and a terminal optical cable are connected to the line terminating device, there is room for improvement in workability of connection of the optical cables. An ATM (asynchronous transfer mode) private line system is known as the FTTH-related system. The ATM private line system is a system in which multimedia is handled as a main service and small and medium business users are targeted.

An ATM-ONU is connected through an optical subscriber line to an ATM-SLT (subscriber line terminal) to configure a subscriber loop system. The optical subscriber line is an optical transmission line with a transmission rate of 155.52 Mbit/s, for example. The ATM-ONU is installed in a user building and accommodates user terminal lines. By mounting a line card into the ATM-ONU, connection to various terminal equipments is allowed.

Although the conventional line terminating device is provided with an area for accommodating an extra length of the terminal optical cable, a terminal optical connector is mounted in the vicinity of an end surface of a housing of the terminal device. Accordingly, in connecting the terminal optical cable to an extension electronic circuit package, the optical cable projects from the housing, so that a protective cover is required. Further, the conventional line terminating device has a laser beam cutting mechanism for cutting off a laser beam outputted from an optical module to prevent a trouble on human eyes. However, this mechanism does not form fundamental means for preventing the trouble, but hinders size reduction and cost reduction of the device.

In the conventional line terminating device, a shield spring is used to prevent leakage of undue electromagnetic noise from the device, causing an increase in number of parts and accordingly a cost increase. Further, the extension electronic circuit package is undesirably withdrawn from the device even by not disconnecting the terminal optical connector from the device, causing a possibility of improper operation. Thus, the conventional line terminating device is not satisfactory in measures for preventing such improper operation.

SUMMARY OF THE INVENTION

It is therefore an object of the present invention to provide a line terminating device having various primary functional components separately mounted to thereby prevent thermal effects of heat generating components from being applied to the other functional components.

It is another object of the present invention to provide a line terminating device having a main printed wiring board vertically mounted to thereby realize a sufficiently small size of the device.

It is a further object of the present invention to provide a line terminating device which has solved the above problems in the conventional device.

In accordance with an aspect of the present invention, there is provided a line terminating device comprising a housing having a front surface, a rear surface having first and second openings for receiving a package, opposite side surfaces each having a plurality of ventilation holes, an upper surface having a plurality of ventilation holes, and a lower surface having a plurality of ventilation holes; a main printed wiring board substantially vertically mounted in a front end portion of said housing on which a first optical module for performing conversion between an optical signal and an electrical signal, a WDM (wavelength division multiplexing module), and electronic components are mounted; an extension electronic circuit package inserted from said first opening into said housing and connected to said main printed wiring board, said extension electronic circuit package having a second optical module for performing conversion between an optical signal and an electrical signal; a power supply package inserted from said second opening into said housing and connected to said main printed wiring board; an extra optical cable length winding drum mounted on said upper surface of said housing; a first optical cable having one end connected to a trunk optical cable and the other end connected to said main printed wiring board; and a second optical cable having one end connected to a terminal device and the other end connected to said second optical module of said extension electronic circuit package.

Extra lengths of the first and second optical cables are wound around the extra optical cable length winding drum. An adapter having an optical attenuator is mounted on the power supply package. The first optical connector connected to the first optical cable and the second optical connector connected to the WDM module are inserted into the adapter and thereby optically coupled to each other.

Preferably, the extra optical cable length winding drum is located on an extension of an optical beam to be outputted from the second optical connector inserted in the adapter. With this structure, even when the first optical connector is disengaged from the adapter, the laser beam outputted from the second optical connector is cut off by the extra optical cable length winding drum, thereby preventing the laser beam from entering the eyes of a worker to cause a trouble.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 2 is a perspective view of the line terminating device after inserting the packages into the housing;

DETAILED DESCRIPTION OF THE PREFERRED EMBODIMENTS

Figure 1:
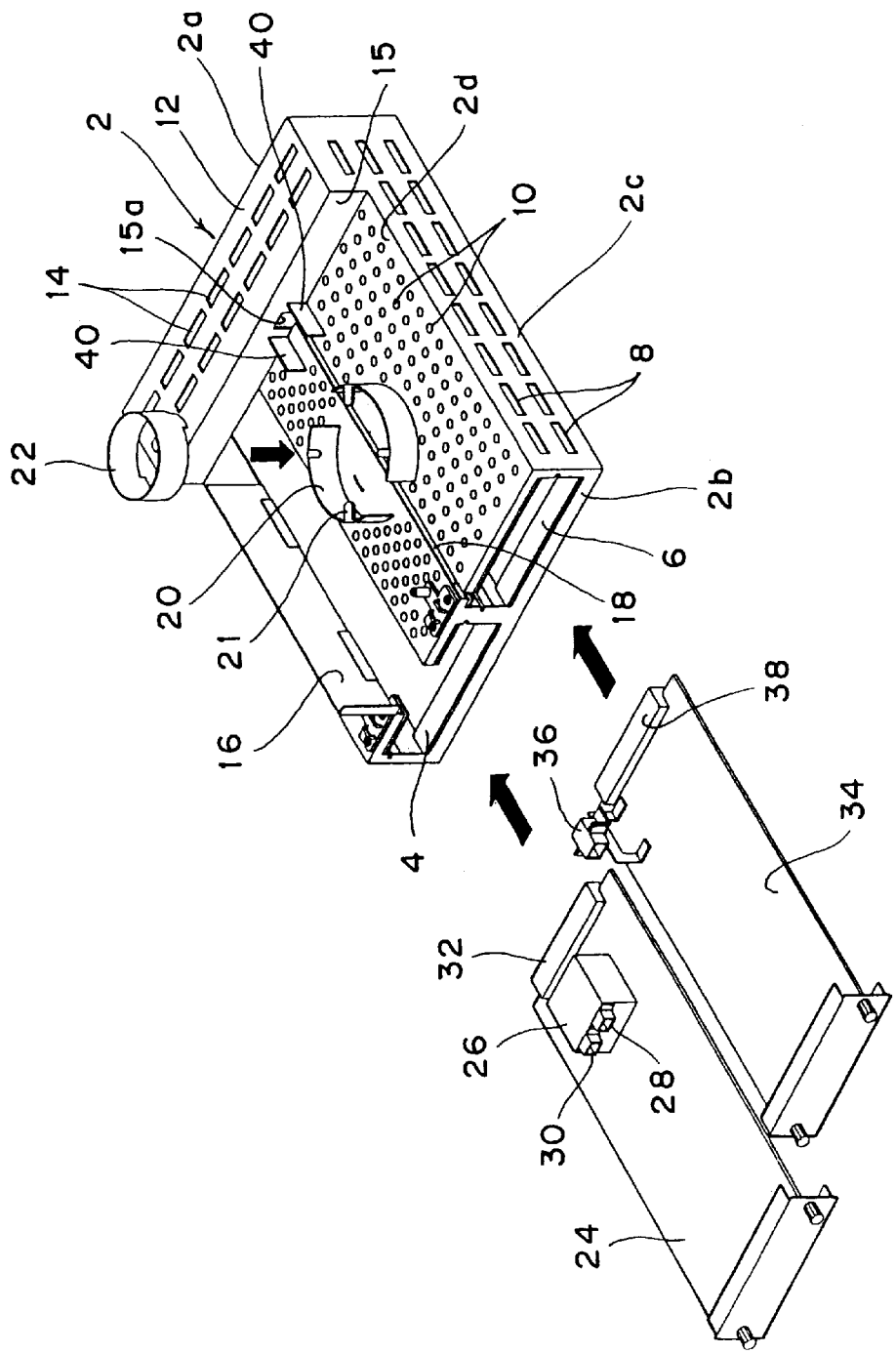
FIG. 1 is a perspective view of a line terminating device according to a preferred embodiment of the present invention before inserting packages into a housing.

A preferred embodiment of the present invention will now be described with reference to the drawings. FIG. 1 is a perspective view showing a condition before inserting an extension electronic circuit package 24 and a power supply package 34 into a housing 2, and FIG. 2 is a perspective view showing a condition after inserting the packages 24 and 34 into the housing. The housing 2 is formed from a sheet metal, and it has a front surface 2a, a rear surface 2b having openings 4 and 6 for respectively receiving the packages 24 and 34, opposite side surfaces 2c each having a plurality of ventilation holes 8, an upper surface 2d having a plurality of ventilation holes 10, and a lower surface (not shown) having a plurality of ventilation holes.

A front end portion of the housing 2 is formed as a main printed wiring board accommodating portion 12. The upper surface of the main printed wiring board accommodating portion 12 is also formed with a plurality of ventilation holes 14. The main printed wiring board accommodating portion 12 is raised at a portion 15 from the upper surface 2d of the housing 2. The upper surface 2d of the housing 2 is provided with an openable cover 16. The cover 16 is pivotable between an open position shown in FIG. 1 and a closed position shown in FIG. 2. In the closed position, the cover 16 is flush with the upper surface 2d of the housing 2. The upper surface 2d of the housing 2 is formed at its substantially lateral center with a longitudinally extending slit 18. A protective drum 20 having a plurality of radial projections 21 is mounted on the upper surface 2d of the housing 2, and an extra optical cable length winding drum 22 is fixed inside the protective drum 20 as shown in FIG. 2.

An optical module 26, an electrical connector 32, and electronic components (not shown) are mounted on the extension electronic circuit package 24. The optical module 26 has an opto-electric conversion function and an electro-optic conversion function, and is provided with two optical connectors 28 and 30 respectively connected to conversion functional components in the module 26. On the other hand, an adapter 36, an electrical connector 38, and electronic components (not shown) are mounted on the power supply package 34. The adapter 36 includes an interference film to serve also as an optical fixed attenuator.

As shown in FIG. 1, the extension electronic circuit package 24 is inserted from the opening 4 of the housing 2 in the open condition of the cover 16. When the cover 16 is closed in the fully inserted condition of the package 24 into the housing 2 through the opening 4 as shown in FIG. 2, the optical module 26 interferes with the cover 16, thereby preventing withdrawal of the package 24 from the housing 2. Similarly, the power supply package 34 is inserted from the opening 6 of the housing 2. During insertion of the package 34 into the housing 2, the adapter 36 mounted on the package 34 is passed through the slit 18 provided in the upper surface 2d of the housing 2.

In the fully inserted condition of the package 34 into the housing 2 as shown in FIG. 2, the adapter 36 is covered on its opposite side surfaces with a pair of plate members 40 fixed to the housing 2, thereby preventing removal of the adapter 36. As shown in FIG. 1, the raised portion 15 has an opening 15a for receiving an optical connector (which will be hereinafter described) between the pair of plate members 40. As shown in FIG. 2, the cover 16 has a splice accommodating portion 42 for accommodating splice portions of optical cables (which will be hereinafter described).

Figure 3:
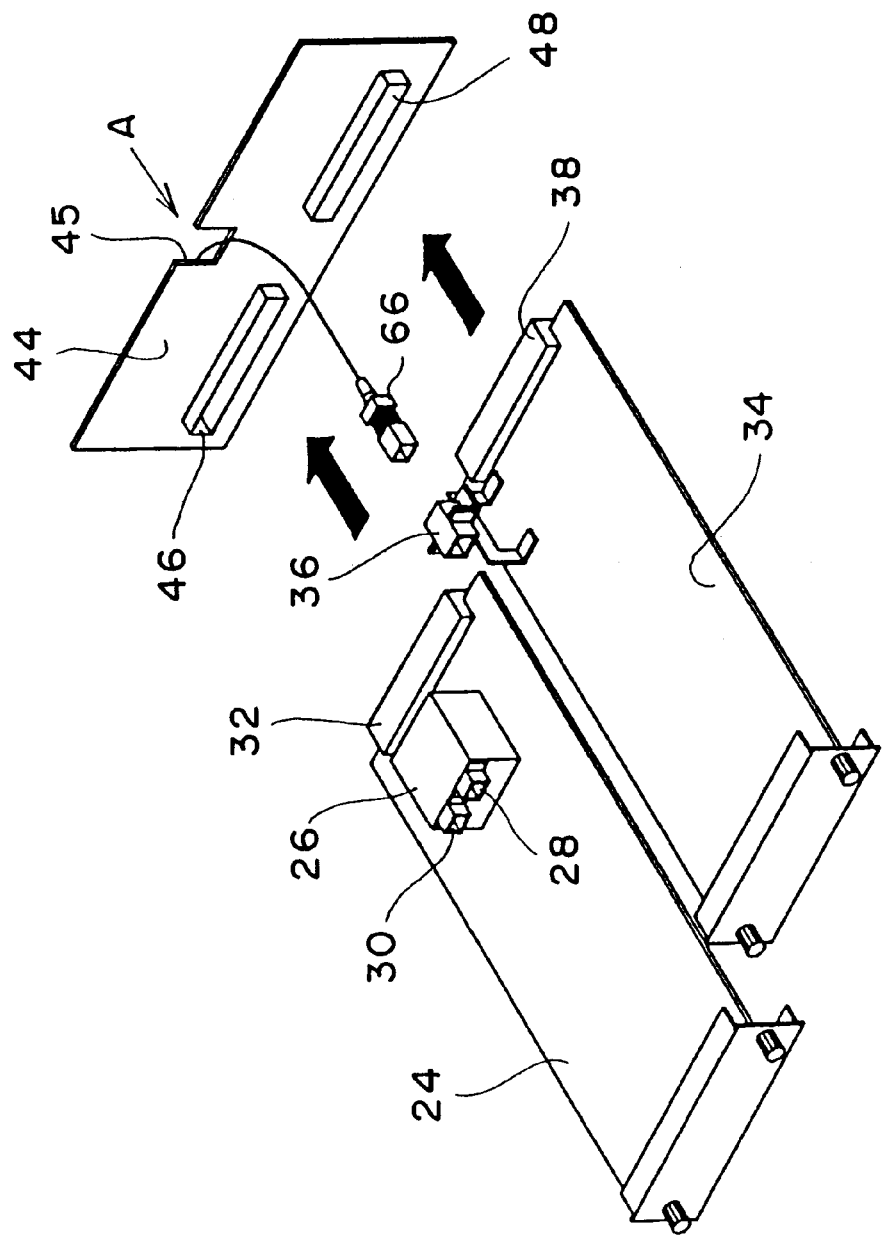
FIG. 3 is perspective view showing the relation between a main printed wiring board and the packages.

When the packages 24 and 34 are fully inserted into the housing 2 as shown in FIG. 2, the electrical connector 32 of the package 24 comes into engagement with an electrical connector 46 mounted on a main printed wiring board 44, and the electrical connector 38 of the package 34 comes into engagement with an electrical connector 48 mounted on the main printed wiring board 44 as shown in FIG. 3. The main printed wiring board 44 is substantially vertically mounted in the main printed wiring board accommodating portion 12 provided in the front surface of the housing 2.

Figure 4:
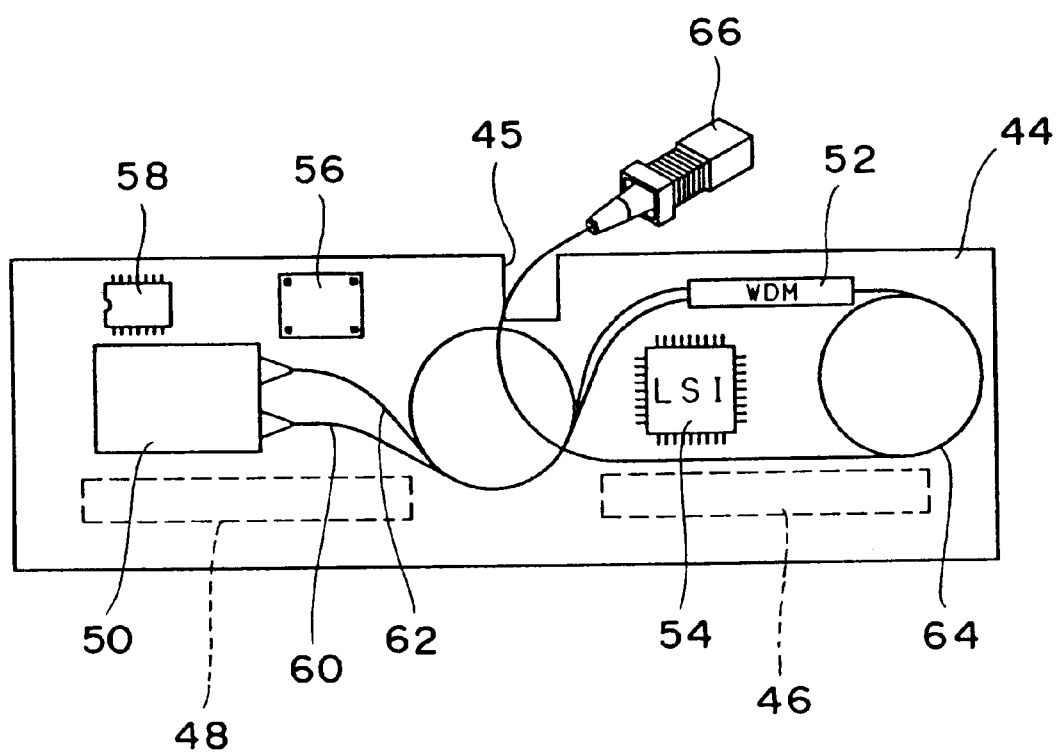
FIG. 4 is a view taken in the direction shown by an arrow A in FIG. 3, showing the main printed wiring board.

Referring to FIG. 4, an optical module 50 having an opto-electric conversion function and an electro-optic conversion function, a wavelength division multiplexing (WDM) module 52, and electronic components 54, 56, and 58 are mounted on the main printed wiring board 44. Two optical cables 60 and 62 are connected at their first ends to the optical module 50 and connected at their second ends to the WDM module 52. An optical cable 64 is connected at its one end to the WDM module 52 and connected at the other end to an optical connector 66. The main printed wiring board 44 is formed at its substantially central upper position with a recess 45 for allowing pass of the optical connector 66.

Figure 5:
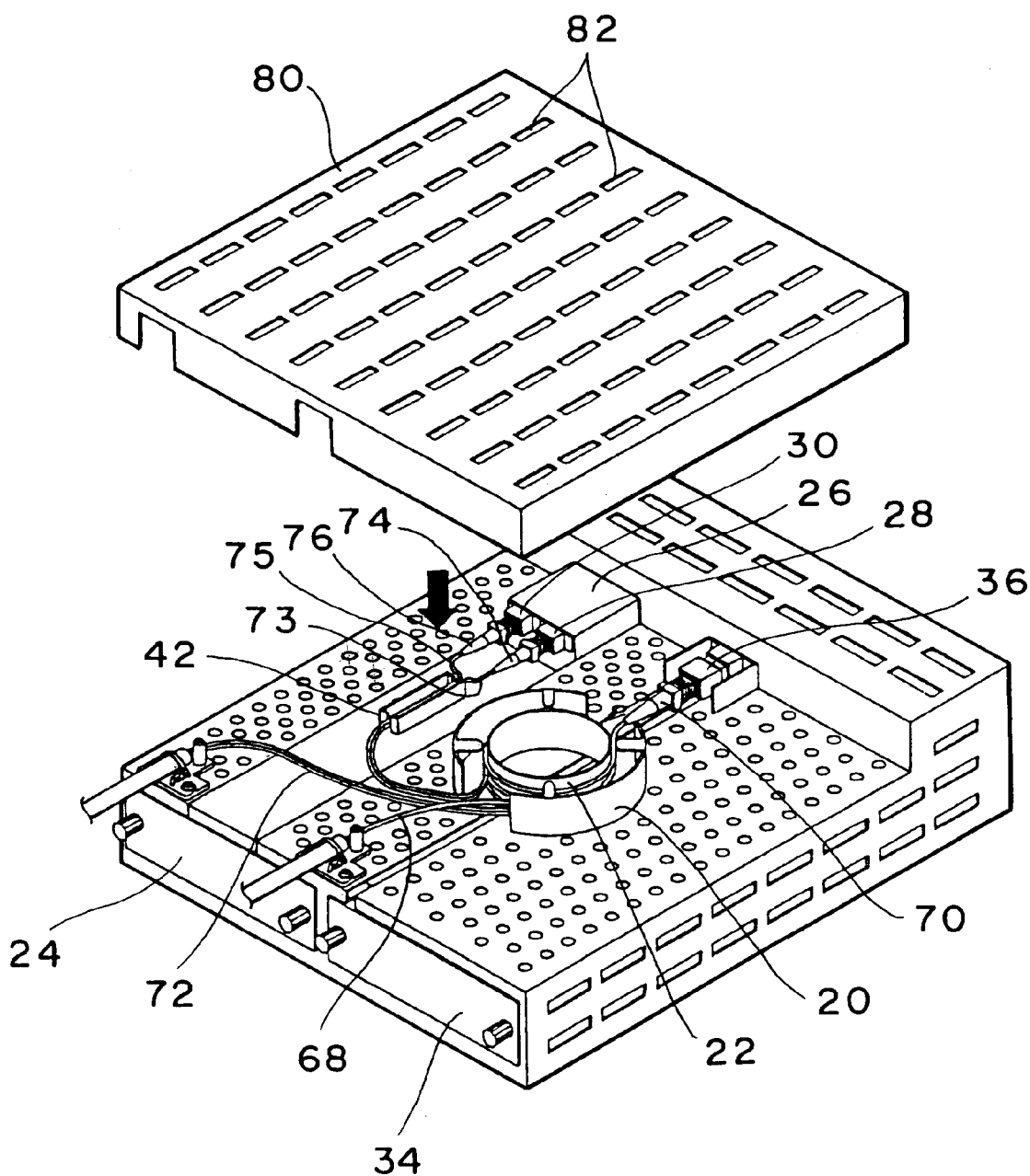
FIG. 5 is a perspective view of the line terminating device after connecting a subscriber optical cable and terminal optical cables to the main printed wiring board.

Referring to FIG. 5, there is shown a perspective view of the preferred embodiment in the condition that a subscriber optical cable 68 and two terminal optical cables 72 are connected to the main printed wiring board 44. The subscriber optical cable 68 is connected at its one end to an optical connector 70, and an extra length of the subscriber optical cable 68 is wound around the extra optical cable length winding drum 22. The optical connector 70 is engaged with the adapter 36. On the other hand, the two terminal optical cables 72 are respectively spliced to two optical cables 73 and 75, and an extra length of each optical cable 72 is wound around the drum 22.

Figure 6:
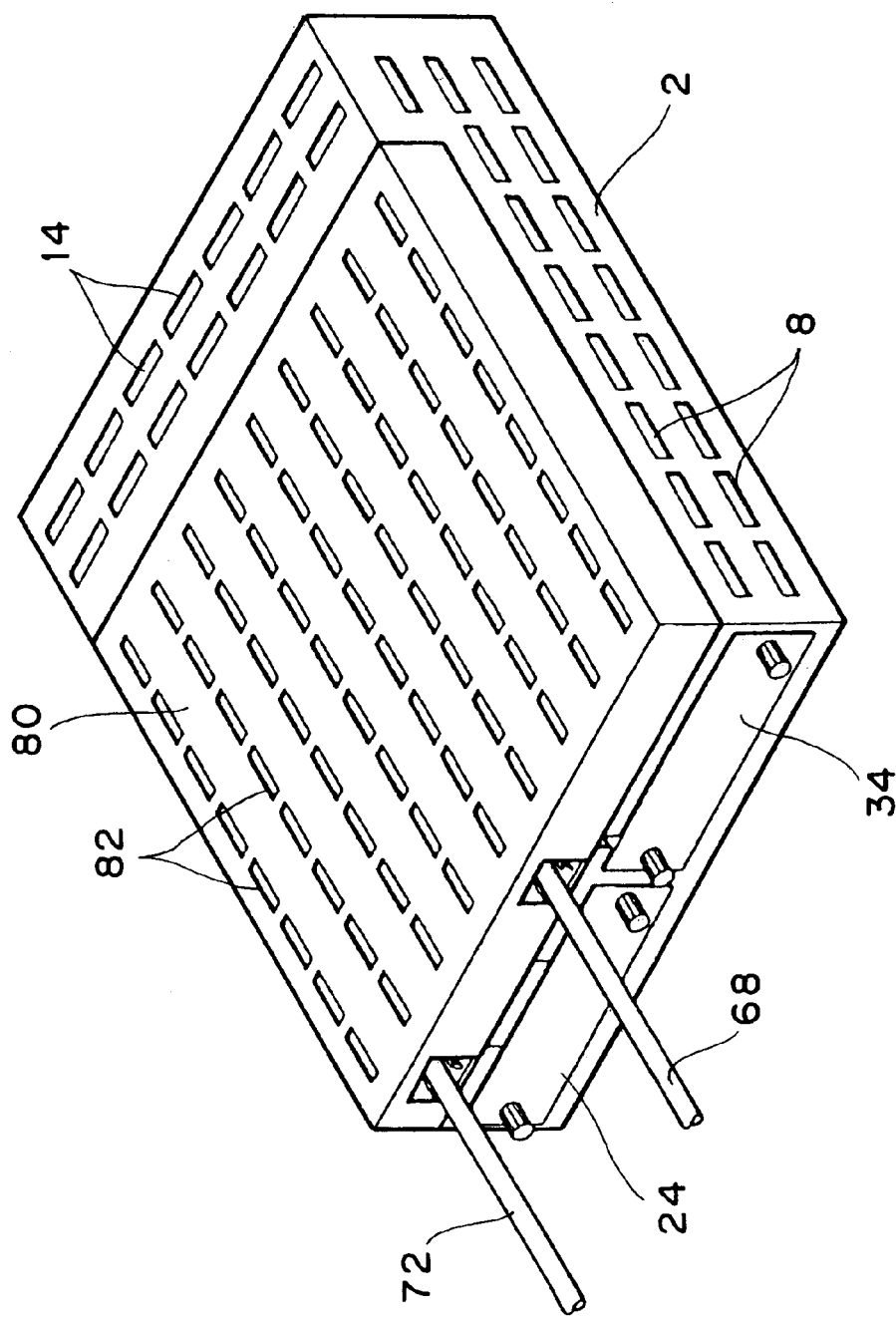
FIG. 6 is a perspective view of the line terminating device after covering the housing with a cover.

The splice portions of the optical fibers 72 and 73 and the optical fibers 72 and 75 are accommodated in the splice accommodating portion 42. The optical cable 73 is connected to an optical connector 74, and the optical cable 75 is connected to an optical cable 76. The optical connector 74 is engaged with the optical connector 28 of the optical module 26, and the optical connector 76 is engaged with the optical connector 30 of the optical module 26. Reference numeral 80 denotes a cover for covering the upper surface 2d of the housing 2. The cover 80 also has a plurality of ventilation holes 82. FIG. 6 shows a condition where the upper surface 2d of the housing 2 is covered with the cover 80. That is, FIG. 6 is a perspective view of the line terminating device according to the present invention of the present invention in its assembled condition.

Figure 7:
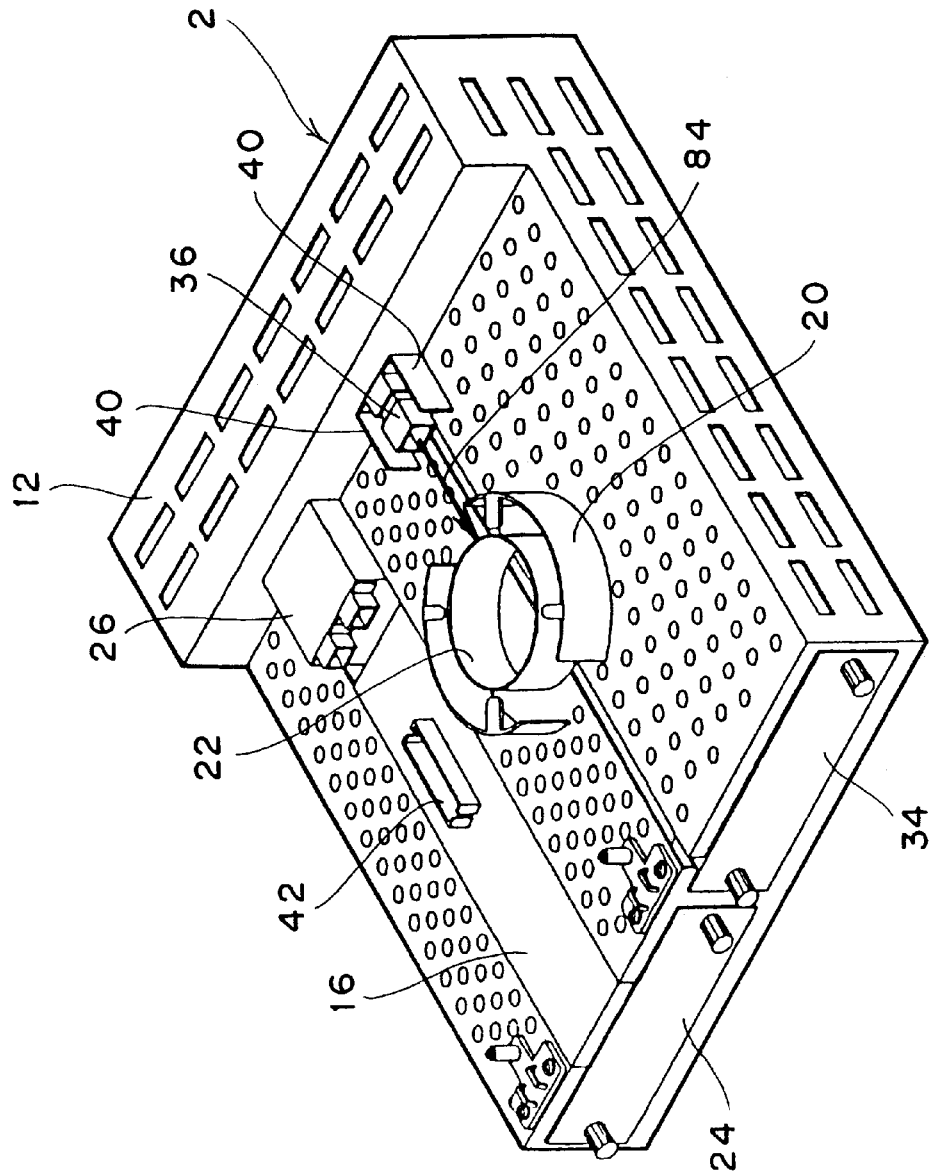
FIG. 7 is a perspective view similar to FIG. 2, illustrating a laser beam cutting function in the preferred embodiment.

FIG. 7 shows a condition similar to that shown in FIG. 2, for illustrating a laser beam cutting function in the preferred embodiment. In the condition that the optical connector 66 is engaged with the adapter 36 and the optical connector 70 is disengaged from the adapter 36, a laser beam 84 is outputted from the optical connector 66 through the adapter 36. In this preferred embodiment, however, the extra optical cable length winding drum 22 is located on an extension of the laser beam 84 to cut off the laser beam 84, thereby effectively preventing the possibility that the laser beam 84 may enter the eyes of a worker to cause a trouble.

The adapter 36 serves also as an optical fixed attenuator as mentioned above. Accordingly, an optical signal to be outputted from the line terminating device to the subscriber optical cable 68 is attenuated to a given level by the optical fixed attenuator 36. Conversely, an optical signal inputted through the subscriber optical cable 68 into the line terminating device is not attenuated to pass the optical fixed attenuator 36.

Figure 8:
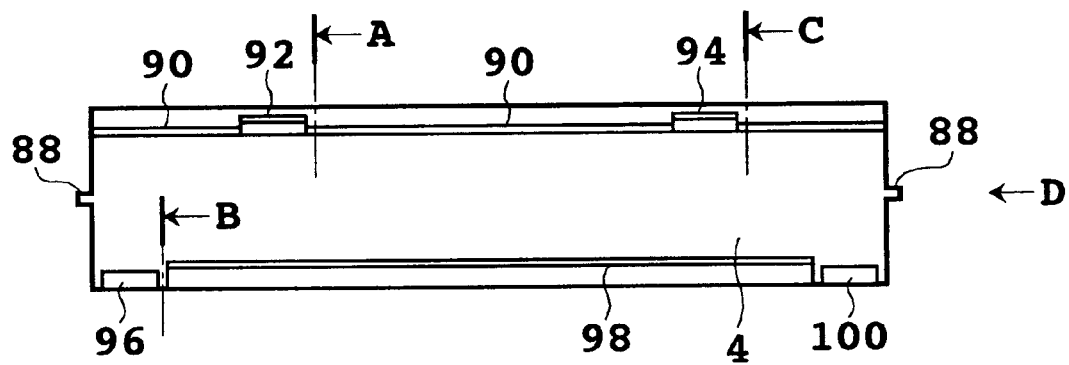
FIG. 8 is an elevational view of an opening for insertion of one of the packages.

Referring to FIG. 8, there is shown an elevational view of the opening 4 for insertion of the extension electronic circuit package 24. The other opening 6 also has substantially the same shape as that of the opening 4. The opposite side edges of the opening 4 is formed with a pair of guide recesses 88 for guiding the package 24. The upper edge of the opening 4 is formed with a straight member 90 and a pair of spaced bent members 92 and 94. The lower edge of the opening 4 is formed with a straight member 98 and a pair of arcuate members 96 and 100 located near the opposite ends of the straight member 98.

Figure 9A:
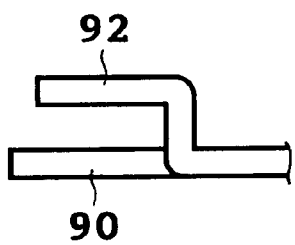
FIG. 9A is a view taken in the direction shown by an arrow A in FIG. 8.
Figure 9B:
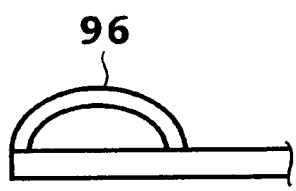
FIG. 9B is a view taken in the direction shown by an arrow B in FIG. 8.
Figure 9C:
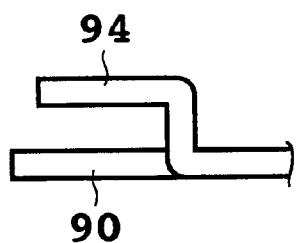
FIG. 9C is a view taken in the direction shown by an arrow C in FIG. 8.
Figure 10A:
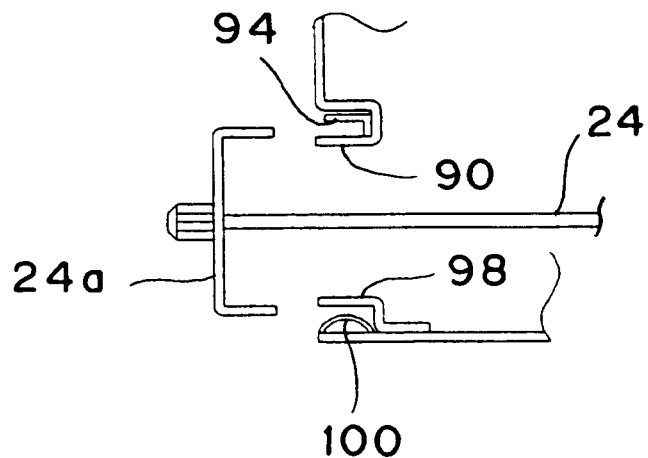
FIG. 10A is a view taken in the direction shown by an arrow D in FIG. 8.
Figure 10B:
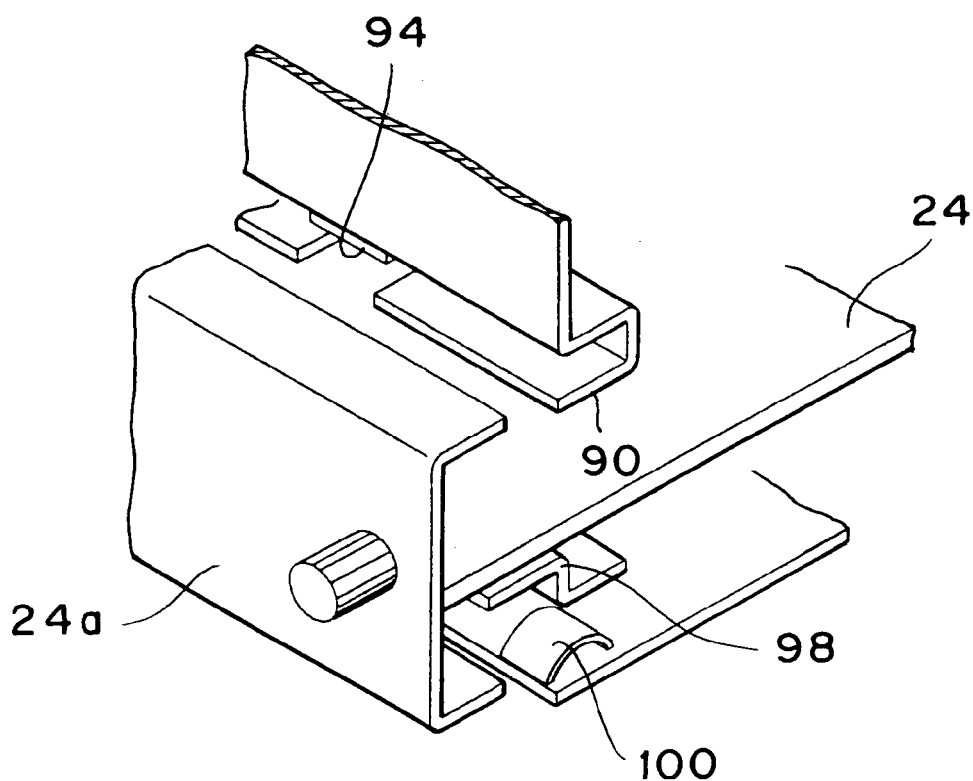
FIG. 10B is a perspective view of FIG. 10A.

FIG. 9A is a view taken in the direction shown by an arrow A in FIG. 8, FIG. 9B is a view taken in the direction shown by an arrow B in FIG. 8, and FIG. 9C is a view taken in the direction shown by arrow C in FIG. 8. FIG. 10A is a view taken in the direction shown by an arrow D in FIG. 8, and FIG. 10B is a perspective view of FIG. 10A.

When the package 24 is inserted from the opening 4 into the housing 2, the package 24 is guided by the pair of guide recesses 88 of the opening 4 and the connector 32 of the package 24 finally comes into engagement with the connector 46 of the main printed wiring board 44. At this time, an upper end portion of a U-shaped end plate 24a of the package 24 is inserted into a space between the straight member 90 and the bent members 92 and 94 as shown in FIGS. 10A and 10B. Similarly, a lower end portion of the U-shaped end plate 24a is inserted into a space between the straight member 98 and the arcuate members 96 and 100 as shown in FIGS. 10A and 10B. With this structure, the opening 4 of the housing 2 is closed to thereby prevent leakage of undue electromagnetic noise from the line terminating device.

Figure 11A:
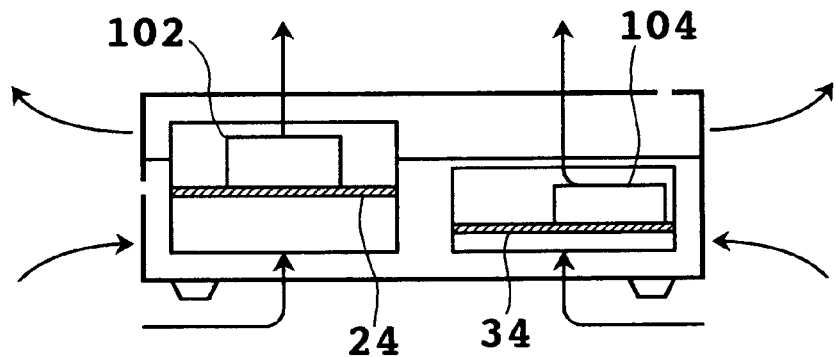
FIG. 11A is a schematic rear elevation of the line terminating device, showing ventilation paths.
Figure 11B:
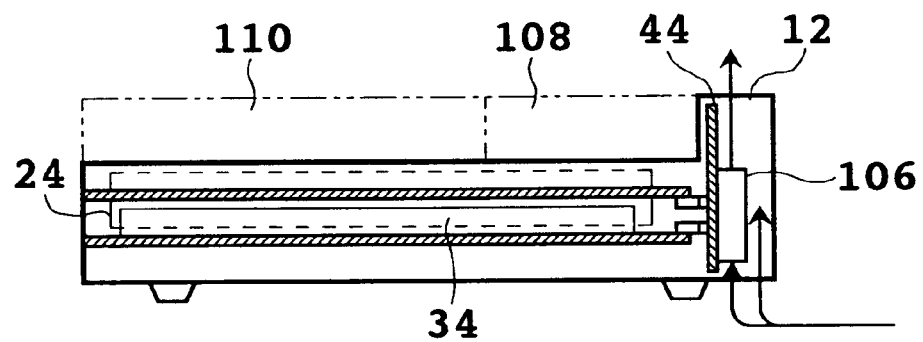
FIG. 11B is a schematic side elevation of the line terminating device, showing a ventilation path.

FIG. 11A is a schematic rear elevation of the line terminating device, illustrating ventilation paths, and FIG. 11B is a schematic side elevation of the line terminating device, illustrating a ventilation path. As shown in FIG. 11A, a heat generating component 102 is mounted on the extension electronic circuit package 24, and a heat generating component 104 is also mounted on the power supply package 34. Cool air from outside of the housing 2 is introduced from the ventilation holes of the lower surface of the housing 2 and from the ventilation holes 8 of the opposite side surfaces 2c of the housing 2 to cool the packages 24 and 34.

Heat generated from the heat generating components 102 and 104 mounted on the packages 24 and 34 is dissipated from the ventilation holes 10 of the upper surface 2d of the housing 2 or from the ventilation holes 8 of the opposite side surfaces 2c of the housing 2. Further, as shown in FIG. 11B, a heat generating component 106 is also mounted on the main printed wiring board 44. Cool air from outside of the housing 2 is introduced from the ventilation holes of the lower surface of the main printed wiring board accommodating portion 12 of the housing 2 to cool the main printed wiring board 44 vertically mounted. Heat generated from the heat generating component 106 mounted on the main printed wiring board 44 is dissipated from the ventilation holes 14 of the upper surface of the main printed wiring board accommodating portion 12. In FIG. 11B, reference numeral 108 denotes an optical module accommodating area, and reference numeral 110 denotes an optical cable accommodating area.

According to the present invention as described above, various primary functional components are separately mounted, so that thermal effects of the heat generating components are prevented from being applied to the other functional components. Furthermore, since the main printed wiring board is vertically mounted, the line terminating device can be made sufficiently compact.

What is claimed is:

1. A line terminating device comprising:

a housing having a front surface, a rear surface having first and second openings for receiving packages, opposite side surfaces each having a plurality of ventilation holes, an upper surface having a plurality of ventilation holes, and a lower surface having a plurality of ventilation holes;

a main printed wiring board substantially vertically mounted in a front end portion of said housing and having a component mounting surface on which a first optical module for performing conversion between an optical signal and an electrical signal, a WDM module, and electronic components are mounted;

an extension electronic circuit package inserted from said first opening into said housing and connected to said main printed wiring board, said extension electronic circuit package having a second optical module for performing conversion between an optical signal and an electrical signal;

a power supply package inserted from said second opening into said housing and connected to said main printed wiring board;

an extra optical cable length winding drum mounted on said upper surface of said housing;

a first optical cable having one end connected to a trunk optical cable and the other end connected to said main printed wiring board; and a second optical cable having one end connected to a terminal device and the other end connected to said second optical module of said extension electronic circuit package.

2. A line terminating device according to claim 1, wherein extra length of said first and second optical cables are wound around said extra optical cable length winding drum.

3. A line terminating device according to claim 1, further comprising:

an adapter mounted on said power supply package;

a first optical connector connected to said first optical cable; and a second optical connector connected to said WDM module;

said first and second optical connectors being inserted into said adapter and thereby optically coupled to each other.

4. A line terminating device according to claim 3, wherein said adapter has an optical attenuator, and said extra optical cable length winding drum is located on an extension of an optical beam to be outputted from said second optical connector engaged in said adapter.

5. A line terminating device according to claim 4, further comprising a pair of plate members fixed to said housing so as to cover opposite side surfaces of said adapter, for preventing removal of said adapter.

6. A line terminating device according to claim 1, wherein said upper surface of said housing has a cover pivotable between an open position and a closed position where said cover is flush with said upper surface of said housing, and when said extension electronic circuit package is inserted into said housing in said open position of said cover and said cover is thereafter pivoted to said closed position, said second optical module interferes with said cover to thereby prevent withdrawal of said extension electronic circuit package from said housing.

* * * * *